United States Patent [19]

Goodley et al.

[11] Patent Number: 4,945,151
[45] Date of Patent: Jul. 31, 1990

[54] CONTINUOUS PRODUCTION OF POLYESTER FILAMENTS

[75] Inventors: George R. Goodley, Kinston; Harold J. Taylor, Emerald Isle, both of N.C.

[73] Assignee: E. I. Du Pont de Nemours and Company, Wilmington, Del.

[21] Appl. No.: 320,551

[22] Filed: Mar. 8, 1989

[51] Int. Cl.$^5$ .............................................. C08G 63/02
[52] U.S. Cl. .................................. 528/272; 528/296; 528/300; 528/304; 528/308.6; 525/437; 525/444; 264/78; 264/176.1; 264/211
[58] Field of Search ............... 528/272, 296, 300, 304, 528/308.6; 525/437, 444; 264/78, 176.1, 211

[56] References Cited

U.S. PATENT DOCUMENTS

| | | | |
|---|---|---|---|
| 4,025,592 | 5/1977 | Bosley et al. | 264/78 |
| 4,092,299 | 5/1978 | MacLean et al. | 528/289 |
| 4,113,704 | 9/1978 | MacLean et al. | 528/289 |

FOREIGN PATENT DOCUMENTS

| | | |
|---|---|---|
| 262824 | 9/1986 | European Pat. Off. |
| 263603 | 9/1986 | European Pat. Off. |

Primary Examiner—Morton Foelak
Assistant Examiner—Sam A. Acquah

[57] ABSTRACT

When varied spin-oriented polyester filaments are produced over the course of time in a continuous multi-machine operation from polymeric precursors, the dyeabilities of the varying products are controlled and adjusted by adding small amounts of a chain-branching agent, such as a derivative of trimellitic acid, preferably trishydroxyethyl trimellitate. The process conveniently lends itself to automation of the control and adjustment operation.

6 Claims, 2 Drawing Sheets

CONTINUOUS PRODUCTION OF POLYESTER FILAMENTS

FIELD OF THE INVENTION

This invention relates to the continuous production of polyester filaments, especially in the form of continuous filament feed yarns, and is more particularly concerned with improvements in and relating to producing spin-oriented polyester filaments in a continuous operation from polymer intermediates, and especially in relation to maintaining dye-uniformity in the resulting yarns and fabrics, despite variations that may originate from the precursors, or from changes desired from time to time in the product yarns, and to compensating for such variations in order to obtain the desired uniformity.

BACKGROUND OF THE INVENTION

Synthetic polyester yarns have been known and used commercially for several decades, having been first suggested by W. H. Carothers, U.S. Pat. No. 2,071,251 and then by Whinfield and Dickson, U.S. Pat. No. 2,465,319. The polyester polymer that has been used most frequently for commercial purposes is polyethylene terephthalate, made from ethylene glycol and dimethyl terephthalate or terephthalic acid, and these polymeric precursors have been conveniently reacted together commercially by ester interchange or direct esterification, respectively, followed by polymerization, generally in multiple stages, with appropriate provision to remove condensation products, such as water, and also excess ethylene glycol that is preferably recycled with removal of unwanted water and by-products, as appropriate.

Originally, polyester yarns were made by a batch operation, involving several separate processes, first making the polyester polymer, and then melt-spinning the polymer into filaments, and then further processing the filaments into continuous filament yarns (or staple fibers) as described, e.g., by Ludewig in "Polyester Fibers, Chemistry and Technology", first published in German in 1964, English translation by John Wiley & Sons Ltd., 1971, and these various separate processes were themselves sometimes carried out in separate stages, in batches. However, as indicated in the literature, there has always been a desire to economize, and so to couple the various separate stages together. Some manufacturers have operated a wholly continuous process, starting with the polymeric precursors that are reacted together and polymerized to form a polyester polymer melt that is extruded into solid filaments that are processed into continuous (multi-filament) yarns as a wholly continuous process. However, many manufacturers, in various countries, have not changed to a continuous process, because of the problems presented by continuous operations. An objective of the present invention is to solve some of these problems in the production of continuous filaments, especially in the form of spin-oriented feed yarns.

In the early 1970's, there was a radical development in the preparation of filament yarns because of the introduction commercially of high speed spinning, whereby spin-oriented filament feed yarns were prepared by high speed spinning at speeds of the order of 3 km per minute for use as draw-texturing feed yarns (DTFY). This technology has been described in many references, such as by Petrille and by Piazza and Reese in U.S Pat. Nos. 3,771,307 and 3,772,872. The feed yarns have sometimes been referred to as POY (for partially-oriented yarns). Accordingly, during the decades of the 1970's and 1980's, many billions of pounds of continuous filament spin-oriented polyester filaments have been manufactured commercially and used, mostly as feed yarns for draw-texturing, i.e. to prepare textured yarns that are used in fabrics and garments, and, accordingly are dyed to produce attractive colors. Filament yarns are particularly sensitive to any lack of uniformity, that generally shows up as differences in dyeability in the resulting fabrics. Much has been written about the importance of achieving dye-uniformity in fabrics of filament yarns, and accordingly of achieving dye-uniformity in the spin-oriented yarns, and the difficulty of achieving this desirable objective, because of their sensitivity to changes in manufacturing conditions, etc. This concept of controlling dyeability is referred to in the trade by use of "merge numbers", which are assigned by fiber producers to assure customers that any fiber sold under any particular merge number will dye uniformly, i.e. similarly to other fiber sold under that same merge number, within specified limits; in the case of DTFY, it is the draw-textured yarn that is dyed, and the DTFY is merely an intermediate, as indicated by the term "feed yarn" or "feeder yarn", this being well known in the art. Any product that is not "mergible" is generally much less profitable, so an important commercial objective is to increase the yield of mergible product or, in other words, to decrease the proportion that is sub-standard in the sense of not being mergible, i.e. not within the specified limits.

The objective (of achieving a fully continuous operation from the polymeric precursors to the package of filament yarn wound, e.g., on a bobbin) has been made more difficult by the need to achieve dye-uniformity, as explained by Bosley et al, U.S. Pat. No. 4,025,592. Bosley's solution to the problem was to improve dye-uniformity by adding small amounts of diethylene glycol (DEG) so as to achieve a predetermined dyeability referred to as the percent dyeability (of a test sample), being a relative measurement of the K/S factor, as described therein. Bosley described how the downstream dyeability (of textured yarn products prepared from his melt-spun yarns) could be determined periodically so that the amount of DEG added upstream could be adjusted to maintain a substantially uniform dyeability. In Example 1, Bosley described a three vessel polyester continuous polymerization system coupled to two spinning machines, one for low speed spinning to give fully-drawn (150 denier, 34 filament) yarns (of break elongation 31%) by a coupled spinning/drawing process, while the other machine was for high speed spinning to give spin-oriented DTFY (425 denier, 34 filament, break elongation 131%), that was subsequently draw-textured to provide textured yarn (of substantially equivalent 150 denier). Such a technique has been operated commercially for several years to provide spin-oriented feed yarns and/or drawn yarns to give products of controlled dyeability.

However, despite the significant advance achieved by the Bosley process, it has not yet been possible to provide mergible products in every particular case by following Bosley's teaching. Thus, a problem that has existed for several years, and that has defied solution hitherto, has been to provide an improvement over Bosley's technique for controlling dyeability in a continuous process for producing spin-oriented yarns from polymeric precursors. (It should be recognized that a continuous operation, of its very essence, must be operated over a rather long period of several days or weeks, during which period a variety of different products may be required, according to the demands of the market, at any particular time, depending on fashion and other considerations; this is in contrast to a batch system, which can be a custom-made operation.)

SUMMARY OF THE INVENTION

Part of the solution to this problem has been the finding that a serious problem has arisen (sometimes) when more than one spinning machine has been coupled to a single polymerization unit. However, it has been noted that Bosley's Example 1 did in fact couple a single polymerization unit (of three vessels in sequence) to more than one spinning machine, and it has been noted that Bosley's technique has been used successfully to provide separately mergible products of controlled dyeability with such multiple spinning machines coupled to a single polymerization unit. Nevertheless, depending on the specific filaments and yarns produced, the Bosley technique, by itself, has not always solved the problem of adjusting and controlling dyeability.

Surprisingly, it has now been found, according to the present invention, that an improvement in achieving and controlling uniform dyeability may be obtained by incorporating into the polymer a very small amount (of the order up to about half a MEQ, i.e. a microequivalent of reactive branching sites per gram of polymer) of a chain-branching agent, and by appropriately adjusting this very small amount to affect (and control by compensatory changes) the dyeability of the resulting filament yarns. The preferred chain-branching agent that has been used successfully, and whose use is more particularly described herein, is a derivative selected from trimellitic and trimesic acids. Such chain-branching of DTFY by such agents is taught by Reese in copending application Ser. No. 907,299, filed Sept. 12, 1986; as indicated therein, much larger amounts (about 4–6 MEQ) were used to solve a different Problem. The preferred chain-branching agent used herein is trishydroxyethyl trimellitate, as disclosed hereinafter, because it can be injected conveniently further downstream, because of its solubility and ease of reaction, and this enables quicker response to be made to differences in dyeability perceived in the downstream products.

In other words, a problem that has existed (in certain instances) for several years when using the Bosley technique of controlling dyeability by adding controlled amounts of DEG can now be solved by controlling and adjusting dyeability by adding and adjusting appropriate amounts of a chain-branching agent. Preferably, as will be explained, dyeability is controlled and adjusted, according to the present invention, by using both techniques, i.e. by adding controlled amounts of DEG and by adding controlled amounts of chain-branching agent, and by adjusting these amounts of both additives. However, the effect of adding the chain-branching agent, according to the present invention, is many times the effect of adding an equivalent amount of DEG, according to Bosley, so this added degree of control is an important advantage of the present invention, over Bosley. Also, however, and perhaps more important in solving the primary problem, is the fact that the effect of the chain-branching agent on dyeability is significantly different for different products (whereas the effect of the DEG is similar, or any difference is not so significant). Products from filaments spun with higher orientation are affected more than products from filaments spun with lower orientation (for draw-texturing at draw ratios of about 1.6X or more) such as have been used as DTFY since the earlier 1970's. More recently, however, there has been a tendency to use DTFY spun with higher orientation, for draw-texturing at lower draw ratios, e.g. of about 1.5X or less. It is believed that it is these higher spin-orientation filaments that have behaved differently (from lower orientation products) so that the DEG Bosley technique (alone) has not been able to maintain uniform dyeability.

Accordingly, the present invention provides an improvement in a continuous process for producing spin-oriented polyester filaments from ethylene glycol and dimethyl terephthalate or terephthalic acid, in which polyester polymer is prepared and melt-spun from a plurality of spinning machines, and wherein such improvement provides an improved capability to spin a plurality of mergible products, such as may be significantly different, wherein the improvement is characterized by incorporating into the polymer a chain-branching agent in a controlled amount which may vary within the range of about 0.2 to about 0.6 MEQ, so as to provide the desired different mergible products. In this regard, it will readily be understood that the "plurality of mergible products", in the context of this invention, is a plurality of distinct products, that are not mergible overall, i.e. with each other, and that may be referred to as products A, B, C, etc., and that, separately, product A is mergible consistently within itself, and that, likewise, separately, product B is mergible consistently, and product C is mergible, etc.

As indicated, DEG is also preferably added, as described hereinbefore in Bosley, which is hereby specifically incorporated by reference, and the dyeability downstream is preferably determined periodically, so the amount of additive(s) can be adjusted to maintain a substantially uniform dyeability.

DETAILED DESCRIPTION OF THE PREFERRED EMBODIMENTS

Figure 1:
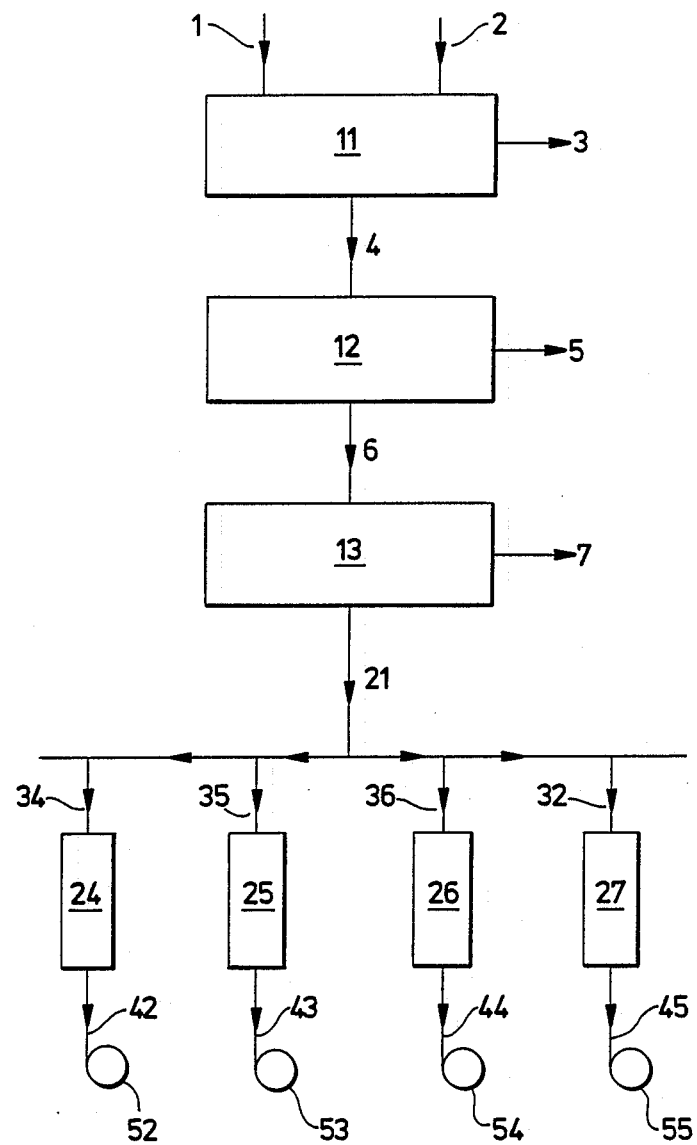
FIG. 1 is a block diagram to illustrate a conventional process (in which polymeric precursors are reacted and polymerized and the resulting polymer is melt-spun to form spin-oriented polyester filaments) that may be adapted and modified according to the present invention.

The essential details of a conventional multi-machine spinning operation have already been given by Bosley, and are outlined and illustrated in FIG. 1. Referring to FIG. 1, a block diagram illustrates a conventional apparatus for preparing polyester polymer and melt-spinning a plurality of yarns from a plurality of spinning machines, such as may be used to operate the process of the invention by appropriate modification, according to the invention. Polyester ingredients are fed separately through feed lines 1 and 2, it being recognized that more than 2 lines may be used, depending on the ingredients and system desired, into a reactor 11. If dimethyl terephthalate and ethylene glycol are used, this will be an ester interchange reaction, whereas, if terephthalic acid is reacted with ethylene glycol, the reaction will be direct esterification. Volatile products, such as methanol and ethylene glycol, are vented off through a line 3 (it will be understood that volatile products may be purified and/or recycled, as desired), while the desired terephthalate ester is passed through line 4 to a prepolymerizer 12. Again volatile products are vented off through a line 5, while the desired pre-polymer is passed through line 6 to a finisher 13, where further volatile products are removed through line 7. It will be understood that more or less than three vessels may be used to prepare the desired polymer, according to convenience and what is desired. The molten polymer that is desired (of appropriate vicosity) emerges from the final polymerization vessel 13 (through line 21) and is passed to the spinning machines (four are shown as 22, 23, 24 and 25, but more or less may be used) through lines 32, 33, 34 and 35, and spun into yarns 42, 43, 44 and 45, that are wound up or otherwise packaged as shown at 52, 53, 54 and 55. Each spinning machine is generally a bank of several spinning positions or units, for which the key process parameters (such as polymer temperature during spinning, quench details and withdrawal speed/winding speed) are controlled together for such group of individual units, so a relatively large number of yarn bundles, for instance, are produced on one machine. It will be recognized that, according to demand from customers, not all of these spinning machines 22, 23, 24 and 25 will necessarily be producing identical yarns 42, 43, 44 and 45, and indeed that any one spinning machine, such as 25, may produce different yarns at different times, and this requires changes and variations in spinning conditions and spinning throughput, which variations have been found can present a problem such as may be solved by the invention. In this regard, it has been found that changes in spinning throughput can be particularly important, especially when a spinning line is not receiving polymer, for any reason, and such spinning changes, that cause changes to throughput upstream, are now believed to be a significant contributor to variations in dyeability, such as have caused problems previously.

The branching agents may be added at any stage of the preparation of the polymer at which they are sufficiently reactive to be effectively incorporated into the polymer. It is important to ensure that any loss of the branching agent in the process due to side reactions or loss due to volatility is considered, as discussed by Bosley with respect to DEG losses. It is relatively easy to detect the presence of some chain-branching agents in the volatile gases that are vented off during the reactions mentioned above, and, if detected, to measure the amounts, and so to calculate the amount of chain-branching agent that will be retained in the polymer and product filaments. Preferably, the branching agent reacts readily to become incorporated in the polymer and has a vapor pressure sufficiently low to prevent or minimize loss before reacting. Derivatives of aromatic tricarboxylic acids, such as trimellitic and trimesic are particularly useful in this respect, and may be introduced in the transesterification vessel or in the esterification vessel with the other reactants. The methyl esters may be introduced during the transesterification reaction. Free acids or their anhydrides may be added during the esterification of terephthalic acid with ethylene glycol. The trishydroxyethyl esters of these may be introduced to the liquid product from transesterification of dimethylterephthalate or from esterification of terephthalic acid with ethylene glycol, and the fact that this chain-branching agent may be incorporated further downstream in the process is an advantage, as explained herein, so this ester is preferred. More details on chain-branching agents and how to calculate MEQ are disclosed by Reese in copending Applications Ser. Nos. 907,298, 907,299 and 907,300, now U.S. Pat. No. 4,833,032 all filed Sept. 12, 1986, that correspond to EP Al published applications Nos. 263,603, and 262,824, the details of which are hereby incorporated by reference; these applications also refer to earlier teachings of use of chain-branching agents (to solve different problems) by MacLean et al in U.S. Pat. Nos. 4,092,299 and 4,113,704, who also refer to even earlier teachings of using chain-branchers.

In some cases, optimum control is achieved when dyeability control by branching agents is augmented by DEG adjustments. The specific percent dyeability values of the products involved determine if changes in branching agent or DEG or both are appropriate as well as the amount each should be changed.

In order to determine the magnitude of the changes in branching agent and DEG required to adjust the dyeability, it is necessary to accurately measure the dyeability of downstream products under conditions simulating actual textile finishing conditions. The following summarizes a standardized method of measuring the dyeability of feed yarn samples taken during each production period:

The feed yarns are draw-textured on a Barmag FK6/900 texturing machine using ceramic discs rotating at 575,000 revolutions per minute under specific conditions. Reference feed yarns specific to each product were also textured in the same manner.

The resulting test and reference textured yarns were then incorporated into a single-knit (jersey) fabric tube so that sections of the tube contain only the test or only the reference yarns using a Lawson-Hemphill FAK knitter with a 54 gauge, 260-needle needle bed and the length of yarn per course controlled by the meter head setting appropriate for the yarn which is shown in Table 1.

TABLE 1

| Feed Yarn Denier | Meter Head Setting |
|---|---|
| 100–265 | 4.0 |
| 266–449 | 4.3 |
| >450 | 5.0 |

The fabric tubes were then scoured and dyed in a Gaston County MINI-JET dyer. For all products the range of fabric-to-bath ratios were 1:180 to 1:550 (with the level for each individual product precisely specified to ensure that samples from each production period were uniformly treated). Lower denier products were run under the conditions of lower fabric-to-bath ratios and higher percent dye. The fabrics were first scoured at 160° C. for fifteen minutes with a bath containing 0.47 to 0.55 gms/l of sodium pyrophosphate and about 1.8 ml/l of "MERPOL" LFH surfactant, then dyed at 200° C. for 30 minutes in an aqueous dye mixture containing: 4.0 to 8.8 (wt % based on fabric) of EASTMAN POLYESTER BLUE GLF Dye; 0.8 to 0.9 ml/l of DOW CORNING 544 antifoam; 0.56 to 0.63 ml/l of "MERPOL" LFH surfactant; 1.9 to 2.2 ml/l of "TANALON" jet carrier; 3.0 to 3.5 ml/l of 10% acetic acid. For products with feed yarn denier below 141, the dyeing time is increased to 60 minutes. The fabric is then scoured at 160° C. for fifteen minutes using a bath of the same composition as the original scour bath. Excess water is removed from the fabric in a centrifuge and the fabric is tumble-dried in a home dryer for fifteen minutes.

Figure 2:
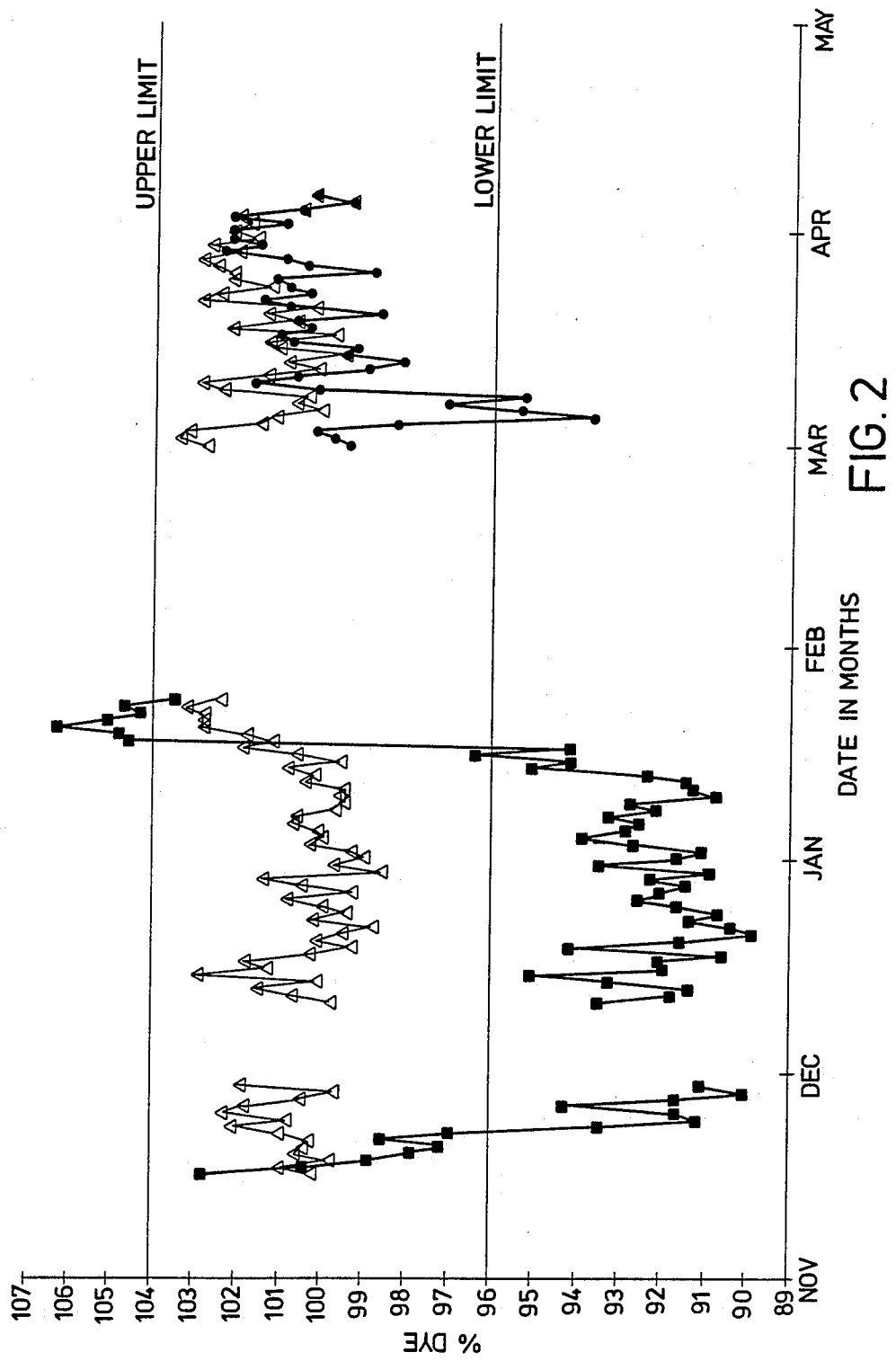
FIG. 2 is a chart plotting percentage dyeability over a period of time, measured in months, as described more specifically in the Example.

The percent dyeability is then determined by measuring the sample reflectance at a wavelength of about 620 nanometers on a KCS-18 COLOREYE COLORIMETER and performing the calculations as described by Bosley. These percentages over a period time may be recorded and plotted on a chart, as shown in FIG. 2, to show their variation, and/or may be used as a basis for automatic feed back to trigger corrections in the amounts of chain-branching agent (and/or DEG, as in Bosley) to maintain the desired uniformity or mergibility within acceptable limits.

The DEG content of the polymer is determined by a gas chromatographic method after depolymerizing the polymer. A polymer sample free of any finish oils is refluxed for at least 30 minutes with a standard mixture of ethanolamine and an inert compound. A portion of the resulting product mixture is then analyzed by gas chromatography and the amount of DEG estimated from the relative areas of the DEG peak and that of the inert compound, the internal standard. These tests are periodically standardized against samples to which known amount of DEG have been added.

Draw tension is measured by a strain gauge as yarns are passed through a 39 inch long tube heated to 185° C. while being drawn at a predetermined draw ratio. This drawing is accomplished using two sets of nip rolls with the second set operated at a speed of 185 yards per minute and the first operated at a slower speed so the yarn is subjected to the desired draw ratio. The average draw tension is based on measurements taken over 10 ten-second intervals.

The invention is further illustrated in the following Example. The yarn properties and test measurements are made as described in Bosley et al. U.S. Pat. No. 4,025,592, except as indicated herein.

EXAMPLE 1

A three vessel polyester continuous polymerization system is coupled to four spinning machines, all spinning draw-texturing feed yarns. Molten dimethylterephthalate (DMT) and ethylene glycol (EG) containing manganese acetate, antimony trioxide, diethylene glycol and other optional ingredients are continuously fed to the first vessel where ester interchange is carried out. The mole ratio of EG to DMT is about 2:1. The catalyst concentrations are sufficient to give 120-130 parts per million Mn and 310-350 parts per million Sb in the polymer. Sufficient diethylene glycol is also added to give 1.5 to 1.7 wt. % DEG in polymer after loss of a portion during later removal of ethylene glycol in the vacuum polymerization vessels and is adjusted in that range as prescribed by Bosley. To the liquid product of the "ester interchange" vessel is added sufficient phosphoric acid to give 100-120 parts per million of phosphorus in the polymer and a slurry of $TiO_2$ in sufficient quantity to give 0.3 weight percent in the polymer. The mixture is transferred to the second vessel where the temperature is increased and the pressure reduced as polymerization is initiated. Excess EG is removed through the vacuum system. The low molecular weight polymer produced is then transferred to the third vessel (finisher) where the temperature is increased to 285-290° C. and the pressure reduced to about 1 mm mercury to remove additional excess EG. The polymer produced has a relative viscosity of 21.

The polymer is then transferred to four spinning machines each consisting of groups of filament producing units for which key process parameters can be controlled for the entire group so that a single, consistent product is produced on the entire machine. From one of these machines a particularly sensitive product is melt-spun at high speed (without a separate drawing step) to give a 240-34 (denier-number of filaments) draw-texturing feed yarn that is of higher orientation (than the others) for draw-texturing at a speed of 700 mpm and a draw ratio of 1.476X. On the three other machines various combinations of lower orientation draw-texturing feed yarns were similarly spun, (exercising appropriate control of the process to meet their predetermined individual denier and draw tension aims) for draw-texturing at a speed of 575 mpm and a draw ratio of 1.628X, namely 255-68, 25-34, 420-54, 115-47, 610-94, and 255-50 feed yarns.

Samples of the above-produced feed yarns are then periodically checked for dyeability as previously described. The results are plotted in a chart, shown as FIG. 2, over a period of about 5 months.

COMPARISON—NOT ACCORDING TO INVENTION

The percent dyeability values measured over an extended production period of about 2 months are plotted on the left side of FIG. 2, with the solid squares (joined by a heavy solid line) indicating those values from the above-mentioned sensitive (higher orientation) 240-34 feed yarn, and the triangles (joined by a lighter line) indicating the values of the average of the percent dyeability of the products from the lower orientation feed yarns spun on the other machines. During this run, adjustments were made according to Bosley in the amount of DEG added to maintain the average dyeability of the products from these other machines on-aim, i.e. the triangles at a value indicated as 100%. It will be noted that the tolerance for variation (some variation being inevitable) is only 4% either way, i.e. up to an upper limit of up to 104%, or down to a lower limit of no less than 96%. The different behaviors, as indicated by the divergence of the squares from the triangles, is apparent from this side of the Figure. For unknown reasons, the percent dyeability of the sensitive product (shown by the squares) decreased rapidly from within the acceptable limits to a value averaging only about 92%, i.e. well below the lowest acceptable value of 96%. The other products, however, remained on aim, within acceptable limits, as shown by the triangles, despite the drop in dyeability for the sensitive product. Experience has demonstrated that any attempt to raise the percent dyeability of this sensitive product by adding DEG, as suggested by Bosley, would also increase the percent dyeability of the other products by the same amount. In other words, if the percent dyeability of the sensitive product were to be returned from about 92% to aim by the Bosley technique, the percent dyeability of the other products would be increased to a value averaging about 108%, well above the acceptable upper limit. In other words, the Bosley technique cannot handle a situation like this when the dyeabilities of different products diverge so much that both cannot be maintained within the acceptable limits. Production was briefly suspended, and then was resumed with the percent dyeability of the products remaining somewhat similar to the values before production was suspended and was continued at such levels for about a month. Much later during this period, the percent dyeability of the sensitive product increased significantly again for unknown reasons, so that it passed right through the acceptable range and then became too high to be acceptable, while the percent dyeability of the other products changed much less during this whole period, and could be retained within the acceptable range by using the Bosley technique. This experience was typical of some previous unsatisfactory experiences with the Bosley technique, if one product can deviate significantly from 100%, whereas other products can be retained more or less constant at about 100% of aim by the Bosley technique.

OPERATION ACCORDING TO INVENTION

The same continuous polymerization system was later operated in the manner described above except that a sufficient amount of a branching agent, the trishydroxyethyl ester of trimellitic acid (TAGE) to give 82 ppm of TAGE in polymer (i.e. 0.24 MEQ) was added to the ethylene glycol input stream and adjusted along with DEG according to the methods described above to maintain percent dyeability better on aim. The percent dyeability values measured are plotted on the right side of FIG. 2. The sensitive product values for this run are indicated by solid circles (joined by a heavy line) and the average of the other products by triangles (lighter line). By adjusting the amount of TAGE (as well as DEG) it was possible to keep the dyeability of the products closer to aim than during the comparison production run (described above) so almost all of this production was within the dyeability limits. The timing of the sharp decrease in dyeability (more pronounced for the sensitive product) at about month number 4 correlated with a change in source of a major polymer ingredient. If the TAGE had been incorporated further downstream, the response (in dyeability) could have been achieved more rapidly, i.e. the dyeabilities could have been returned to aim more rapidly, and the amount of fiber outside the limits could have been reduced. Appropriate adjustments in the amounts of TAGE and DEG added with the ethylene glycol were made to produce an increase of 0.06 mmol/kg of TAGE in yarn and a decrease of 0.02 weight percent DEG in yarn. In this regard, it should be recognized that for higher orientation products (such as the sensitive product mentioned above), the effect of adding a branching agent is very significant, as it has proved possible to increase the dyeability about 30% by using 1 MEQ, which is about 75X the effect obtained by an equivalent amount of DEG.

As soon as the dyeability (downstream) drifts away from aim (to a significant or predetermined extent) it is possible to correct upstream (by adjusting the amount of chain-branching agent, and DEG) so as to affect the dyeability downstream, and keep it within the desirable limits. Experience on an empirical basis is of great assistance in minimizing the amount of fiber that is spun without meeting dyeability requirements (downstream), but it is also practical to develop formulas or equations to relate the amounts of TAGE and DEG that may be needed (for any particular system and products, etc.) to correct specific dyeability variations, and so the process of the present invention lends itself readily to automation of this control and adjustment operation.

This process has proved remarkably effective over a period of several months, as can be indicated by the following comparisons. When using the Bosley technique to prepare several million pounds of DTFY, three sensitive products had large proportions that were non-mergible (i.e. unacceptable being out of dyeability limits), amounting to about 10.5%, about 3%, and about 11.5%, for these three products. When, however, the process of the invention was used over a comparable period, producing similar total quantities of these same sensitive products, the non-mergible proportions dropped remarkably to, respectively, about 0.5%, zero, and 7.5%.

Although the main commercial use of the invention is expected to be for making feed yarns, for draw-texturing as an example, because of the extreme sensitivity of fabrics of filament yarns to differences in dyeability, the invention may be adapted for preparing continuous filaments for other purposes, as will be readily apparent to those skilled in the art. For instance, in recent years, there has been increasing interest in using high speed spinning processes for preparing a variety of polyester filaments for entirely different purposes.

We claim:

1. An improvement in a continuous process for producing spin-oriented polyester filaments from ethylene glycol and dimethyl terephthalate or terephthalic acid, in which polyester polymer is prepared and melt-spun from a plurality of spinning machines, and whereby said improvement provides a capability to spin a plurality of mergible products, wherein said improvement is characterized by incorporating into the polymer a chain-branching agent in controlled amounts which may vary within the range of about 0.2 to about 0.6 MEQ and wherein dyeability of products prepared from the filaments is determined periodically and the amounts of chain-branching agent added are varied and adjusted to maintain a substantially uniform dyeability in said mergible products.

2. An improvement in a continuous process for producing spin-oriented polyester filament yarns from ethylene glycol and dimethyl terephthalate or terephthalic acid, in which polyester polymer is prepared and melt-spun from a plurality of spinning machines, and whereby said improvement provides a capability to spin a plurability of mergible products, wherein said improvement is characterized by incorporating into the polymer a chain-branching agent, in controlled amounts which may vary in within the range of about 0.2 to about 0.6 MEQ, and adding diethylene glycol, in an amount which may vary within the range of about 0.1 to about 2 mole percent, to provide polyester polymer fiber of less than about 3 mole percent ether content, and wherein dyeability of products prepared from the filaments is determined periodically and the amounts of chain-branching agent added are varied and adjusted to maintain a substantially uniform dyeability in said mergible products.

3. A process as defined in claim 2, wherein the amounts of diethylene glycol added are also varied and adjusted to maintain a substantially uniform dyeability in said mergible products.

4. A process as defined in any of claims 1 to 3, wherein the chain-branching agent is a derivative of trimellitic acid.

5. A process as defined in any of claims 1 to 3, wherein the chain-branching agent is trishydroxyethyl trimellitate.

6. A process as defined in claim 5, wherein the preparation of the polyester polymer is carried out in more than one stage, comprising an esterification stage followed by one or more polymerization stages, and the trishydroxyethyl trimellitate is incorporated at a polymerization stage.

* * * * *